United States Patent
Redin

(10) Patent No.: US 8,844,935 B2
(45) Date of Patent: Sep. 30, 2014

(54) SEAL ARRANGEMENT

(75) Inventor: Juan Redin, Chesapeake, VA (US)

(73) Assignee: Gamesa Innovation & Technology, S.L., Sarriguren (Pamplona) (ES)

( * ) Notice: Subject to any disclaimer, the term of this patent is extended or adjusted under 35 U.S.C. 154(b) by 23 days.

(21) Appl. No.: 13/085,941

(22) Filed: Apr. 13, 2011

(65) Prior Publication Data

US 2012/0261885 A1   Oct. 18, 2012

(51) Int. Cl.
- F16J 15/447 (2006.01)
- F16J 15/16 (2006.01)
- F16J 15/34 (2006.01)

(52) U.S. Cl.
CPC ............ F16J 15/164 (2013.01); F16J 15/3456 (2013.01); F16J 15/4476 (2013.01)
USPC ........... 277/412; 277/351; 277/411; 277/418; 277/551; 277/562; 277/576; 277/577

(58) Field of Classification Search
USPC ......... 277/351, 411, 412, 418, 551, 562, 576, 277/577
See application file for complete search history.

(56) References Cited

U.S. PATENT DOCUMENTS

| | | | |
|---|---|---|---|
| 4,121,694 A | 10/1978 | Nelson | |
| 4,470,388 A * | 9/1984 | Showalter | 123/193.6 |
| 5,813,675 A | 9/1998 | Otto | |
| 6,102,409 A | 8/2000 | Furuyama et al. | |
| 6,257,587 B1 * | 7/2001 | Toth et al. | 277/309 |
| 6,325,382 B1 * | 12/2001 | Iwamoto et al. | 277/368 |
| 6,682,077 B1 * | 1/2004 | Letourneau | 277/412 |
| 6,834,859 B2 | 12/2004 | Tones | |
| 6,843,482 B1 * | 1/2005 | Bayne | 277/412 |
| 7,055,828 B2 | 6/2006 | Hatch et al. | |
| 7,857,320 B1 | 12/2010 | Chang | |
| 2004/0080113 A1 * | 4/2004 | Linden et al. | 277/412 |
| 2004/0119238 A1 * | 6/2004 | Skumawitz et al. | 277/412 |
| 2008/0246224 A1 | 10/2008 | Pabst et al. | |
| 2009/0190874 A1 | 7/2009 | Burner et al. | |
| 2010/0102514 A1 * | 4/2010 | Lipot | 277/412 |
| 2010/0135607 A1 | 6/2010 | Rogall et al. | |
| 2010/0181730 A1 * | 7/2010 | Roddis | 277/412 |
| 2010/0244386 A1 | 9/2010 | Horling et al. | |
| 2012/0162628 A1 * | 6/2012 | Van Der Blij et al. | 355/72 |

* cited by examiner

Primary Examiner — Kristina Fulton
Assistant Examiner — Eugene G Byrd
(74) Attorney, Agent, or Firm — Maier & Maier, PLLC

(57) ABSTRACT

A sealing arrangement for a bearing assembly. The sealing arrangement can include a static seal carrier coupled to a static component of the bearing assembly and including a first plurality of rings, a rotating seal carrier coupled to a rotating component of the bearing assembly and including a second plurality of rings, the first plurality of rings and the second plurality of rings disposed in an interdigitated arrangement so as to define a tortuous passageway therebetween, the tortuous passageway having one end in communication with a high pressure area of the bearing assembly and a second end in communication with a low pressure area of the bearing assembly, and a scraper seal coupled to the rotating seal carrier and disposed over the second end of the tortuous passageway.

12 Claims, 1 Drawing Sheet

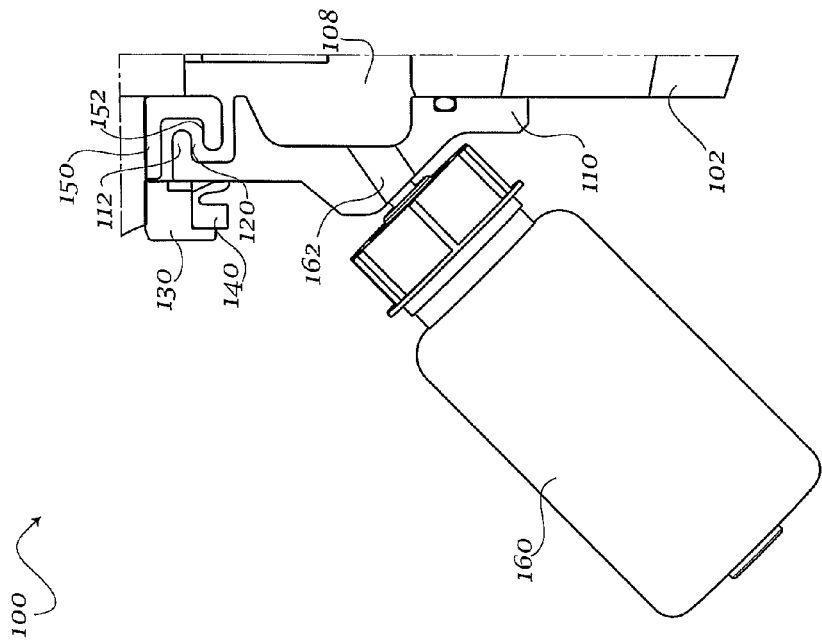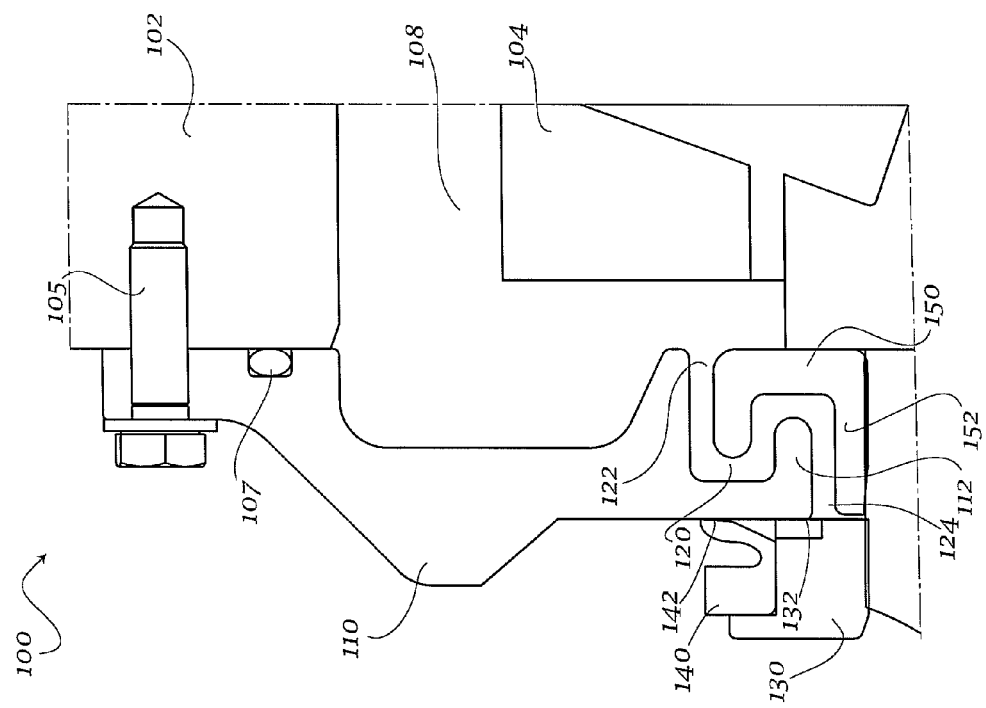

SEAL ARRANGEMENT

BACKGROUND

In recent years, wind turbines have increased in popularity as a means of electrical power generation. Wind turbines offer the advantages of relatively inexpensively generating power from a renewable energy source as well as having a low impact on the surrounding environment.

Rotating components in machinery such as wind turbines are typically supported by bearings so as to minimize the amount of friction between the rotating and non-rotating components of the machinery in question. To minimize component wear and further reduce friction, the bearing assemblies are lubricated by oils, greases or similar substances. Retention of the lubricants within the bearing assembly is vital, as lubricant leakage out of the bearing assembly can lead to increased friction, component failure, as well as contamination of the surrounding environment. Likewise, it is necessary to impede the entry of external contaminants into the bearing assembly to protect components and maintain low friction.

As the bearing assemblies contain both static and rotating components, forming an effective, low-friction seal between the interior and exterior of the assembly presents difficulties. Sealing solutions include contact and non-contact seal arrangements; however, each type of seal has its shortcomings. Contacting seals wear out and weaken due to friction between the static and rotating parts, eventually resulting in lubricant leakage and contaminant entry. Non-contacting seals can reduce lubricant leakage while maintaining low friction and eliminating wear on the seal components; however, such seals do not completely eliminate leakage, especially in applications with large component diameters, and may not completely prevent contaminant entry. An effective, low friction seal arrangement for large diameter applications is therefore desired.

SUMMARY

According to at least one exemplary embodiment, a sealing arrangement for a bearing assembly is disclosed. The sealing arrangement can include a static seal carrier coupled to a static component of the bearing assembly and including a first plurality of rings, and a rotating seal carrier coupled to a rotating component of the bearing assembly and including a second plurality of rings. The first plurality of rings and the second plurality of rings can be disposed in an interdigitated arrangement so as to define a tortuous passageway therebetween, the tortuous passageway having one end in communication with a high pressure area of the bearing assembly and a second end in communication with a low pressure of a first plurality of axially projecting rings. The sealing arrangement can further include a scraper seal coupled to the rotating seal carrier and disposed over the second end of the tortuous passageway, and a dust seal coupled to and disposed radially outward from the scraper seal.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 1a is a cross-section of an upper portion of a bearing assembly including a seal arrangement.

FIG. 1b is a cross-section of an upper portion of a bearing assembly including a seal arrangement.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a seal arrangement is provided. The seal arrangement may be used in conjunction with a lubrication system for a rotating shaft and associated bearing assembly, such as, for example, the bearing assembly for supporting the main shaft of a wind turbine. The seal arrangement may include a labyrinth seal and a scraper seal disposed over an end of the labyrinth seal so as to suppress the leakage of any grease that may pass through the labyrinth seal. A dust seal may be provided proximate to the labyrinth seal so as to prevent entry of contaminants into the bearing assembly. A low-friction seal arrangement that can prevent lubricant leakage may therefore be provided.

FIGS. 1a-1b show a cross-section of an exemplary embodiment of a seal arrangement 100. The seal arrangement may include a static seal carrier 110 and a rotating seal carrier 150. Static seal carrier 110 may be secured to the bearing housing 102, or to another static component of the bearing assembly, for example by bolt 105, while rotating seal carrier 150 may be secured to the rotating main shaft (not shown) of the wind turbine, or to another rotating component of the bearing assembly, for example by thermal press fitting. An O-ring 107 may be disposed between static seal carrier 110 and housing 102 so as to impede any potential grease leakage through the junction between static seal carrier 110 and housing 102. O-ring 107 may be formed from hydrogenated nitrile butadiene rubber (HNBR), nitrile butadiene rubber (NBR), or any other compound known in the art that enables seal arrangement 100 to function as described herein.

Static seal carrier 110 may include a plurality of labyrinth rings 112 that cooperate with a complementary plurality of labyrinth rings 152 included on rotating seal carrier 150, so as to form a labyrinth seal. Labyrinth rings 112, 152 may be projected axially, and can be disposed in an interdigitated arrangement. The interdigitated arrangement of labyrinth rings 112, 152 can define a tortuous passageway 120 having a first end 122 in communication with a high pressure area of the bearing assembly, and a second end 124 in communication with a low pressure area of the bearing assembly. For example, first end 122 may be in communication with an interior cavity of the bearing assembly, such as bearing chamber 108 in which the bearing 104 and the lubricant are disposed, while second end 124 may be in communication with the exterior of the bearing housing 102. A cross-section view of an exemplary labyrinth ring arrangement may be seen in FIGS. 1a-1b. The number of labyrinth rings 112, 152 may be varied as desired depending on the particular application for which the seal arrangement is being used.

Disposed proximate second end 124 of tortuous passageway 120 may be a scraper seal 130. Scraper seal 130 may have an annular shape and may be formed from an inelastic, low-friction-coefficient material, such as, for example, polytetrafluoroethylene (PTFE). Scraper seal 130 can be secured to rotating seal carrier 150, for example by a metallic support, or by any other securing arrangement known in the art. Scraper seal 130 can further be removably secured to rotating carrier 150, allowing replacement of scraper seal 130 when necessary.

Scraper seal 130 can extend radially outward from rotating seal carrier 150 such that an axially inner edge 132 of the scraper seal is disposed over, and is in contact with, static seal carrier 110. Furthermore, as a consequence of this arrangement, the axially inner edge of scraper seal 130 can also be disposed over the second end 124 of passageway 120 such that the communication between passageway 120 and the exterior of the bearing housing is blocked by the inner edge 132. Scraper seal 130 can thus serve as a complement to the labyrinth seal defined by labyrinth rings 112, 152 by suppressing leakage of grease from the second end of tortuous passageway 120.

Scraper seal 130 can function to suppress grease leakage from the bearing assembly, as well as suppress contaminant penetration into the bearing assembly, while maintaining low friction between the static and rotating parts of the assembly. During operation, the labyrinth seal defined by labyrinth rings 112, 152 can serve as an initial impediment to grease leakage from the bearing assembly, impeding grease penetration through the length of tortuous passageway 120. However, as a consequence of the discrepancy between the tolerances required for an effective labyrinth seal and the tolerances present in large-diameter applications such as wind turbines, the labyrinth seal may not completely impede the grease leakage from the bearing assembly. While the majority of grease can be retained by the labyrinth seal, over time, an amount of grease may travel through the length of tortuous passageway 120 towards second end 124 thereof. At this point, scraper seal 130, which is disposed over the second end 124 of passageway 120, can retain the grease within passageway 120 and prevent the grease from leaking to the exterior of bearing housing 102.

As the axially inner edge 132 of scraper seal 130 is in contact with static seal carrier 110, inner edge 132 can eventually wear away, deform, or creep during continued operation of the bearing assembly due to friction between inner edge 132 and static seal carrier 110. The result is that a clearance can be formed between the inner edge and the static seal carrier. However, rather than permitting significant grease leakage, the resultant clearance can then serve as a capillary seal, thereby further impeding the leakage of grease from the bearing assembly. The width of the clearance may vary at various locations around scraper seal 130, due to, for example, local deformations under extreme loads during operation of the bearing assembly. Additionally, the efficacy of the resultant capillary seal may vary as a function of the width of the clearance between inner edge 132 and static seal carrier 110, the pressure exerted on the grease, the interfacial tension between the grease and the external environment, as well as the physical properties of the particular grease being utilized, such as wetting, surface tension, viscosity, cohesive forces, and so forth. However, due to the high viscosity of bearing grease in wind turbine applications, the resultant capillary seal can be effective at impeding grease leakage at the expected clearances that can result from the operation of the bearing assembly. Should the efficacy of the capillary seal fall below desired specifications, scraper seal 130 may be replaced, thereby restoring the full impediment of grease leakage from the bearing assembly.

Disposed radially outward from, and coupled to scraper seal 130 may be dust seal 140. Dust seal 140 may be a V-ring seal and may be formed from an inelastic, low-friction-coefficient material, such as, for example, PTFE. An axially inner edge 142 of dust seal 140 can be disposed over, and be in contact with, static seal carrier 110. Dust seal 140 may thus serve to impede the penetration of contaminants into the bearing assembly, and may be provided as a lifetime or replaceable component, as desired.

An evacuation cartridge 160 may be provided in conjunction with the sealing arrangement described herein. Evacuation cartridge 160 may be coupled to the exterior of bearing housing 102, for example to static seal carrier 110. A passageway 162 may be defined between bearing chamber 108 and evacuation cartridge 160. Passageway 162 may provide an alternative exit path for the lubricating grease. The alternative exit path may be configured such that there is less impediment for the grease to exit via the alternative exit path, thereby reducing the amount of grease directed through the labyrinth seal and consequently further reducing the amount of grease leakage from the bearing assembly.

Additionally, a complementary automatic injection system (not shown) may be provided in conjunction with the sealing arrangement and evacuation cartridge described herein. The injection system can provide appropriate grease renewal to the bearing assembly.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A sealing arrangement for a bearing assembly for supporting a main shaft of a wind turbine, comprising:
   a static seal carrier coupled to a static component of the bearing assembly and comprising a first plurality of axially projecting rings;
   a rotating seal carrier coupled to a rotating component of the bearing assembly and comprising a second plurality of axially projecting rings;
   the first plurality of rings and the second plurality of rings disposed in an interdigitated arrangement so as to define a tortuous passageway therebetween;
   the tortuous passageway having one end in communication with a high pressure area of the bearing assembly and a second end in communication with a low pressure area of the bearing assembly;
   a scraper seal coupled to the rotating seal carrier and disposed over the second end of the tortuous passageway;
   an axially inner edge of the scraper seal is in contact with the static seal carrier; and
   a dust seal coupled to and disposed radially outward from the axially inner edge of the scraper seal.

2. The sealing arrangement of claim 1, wherein the contact between the scraper seal and the static seal carrier is sufficient to wear away the edge of the scraper seal during operation of the bearing assembly, so as to form a capillary seal between the scraper seal and the static seal carrier.

3. The sealing arrangement of claim 1, wherein the scraper seal is formed from PTFE.

4. The sealing arrangement of claim 1, wherein the dust seal is formed from PTFE.

5. The sealing arrangement of claim 1, wherein the high pressure area is an interior cavity of the bearing assembly.

6. The sealing arrangement of claim 1, wherein the low pressure area is the exterior of a first plurality of axially projecting rings.

7. A sealing arrangement for a bearing assembly for supporting a main shaft of a wind turbine, comprising:
   a tortuous passageway disposed between a static component of the bearing assembly and a rotating component of the bearing assembly, the tortuous passageway having a first end in communication with a high pressure area of the bearing assembly and a second end in communication with a low pressure of the bearing assembly;
   a scraper seal coupled to a rotating component of the bearing assembly and disposed over the second end of a labyrinth seal defined by labyrinth rings;
   an axially inner edge of the scraper seal is in contact with a static component of the bearing assembly; and
   a dust seal coupled to and disposed radially outward from the axially inner edge of the scraper seal.

8. The sealing arrangement of claim 7, wherein the contact between the scraper seal and the static component is sufficient to wear away the edge of the scraper seal during operation of the bearing assembly, so as to form a capillary seal between the scraper seal and the static component.

9. The sealing arrangement of claim 7, wherein the scraper seal is formed from PTFE.

10. The sealing arrangement of claim 7, wherein the dust seal is formed from PTFE.

11. The sealing arrangement of claim 7, wherein the high pressure area is an interior cavity of the bearing assembly.

12. The sealing arrangement of claim 7, wherein the low pressure area is the exterior of a first plurality of axially projecting rings.

* * * * *